United States Patent Office 3,527,106
Patented Sept. 8, 1970

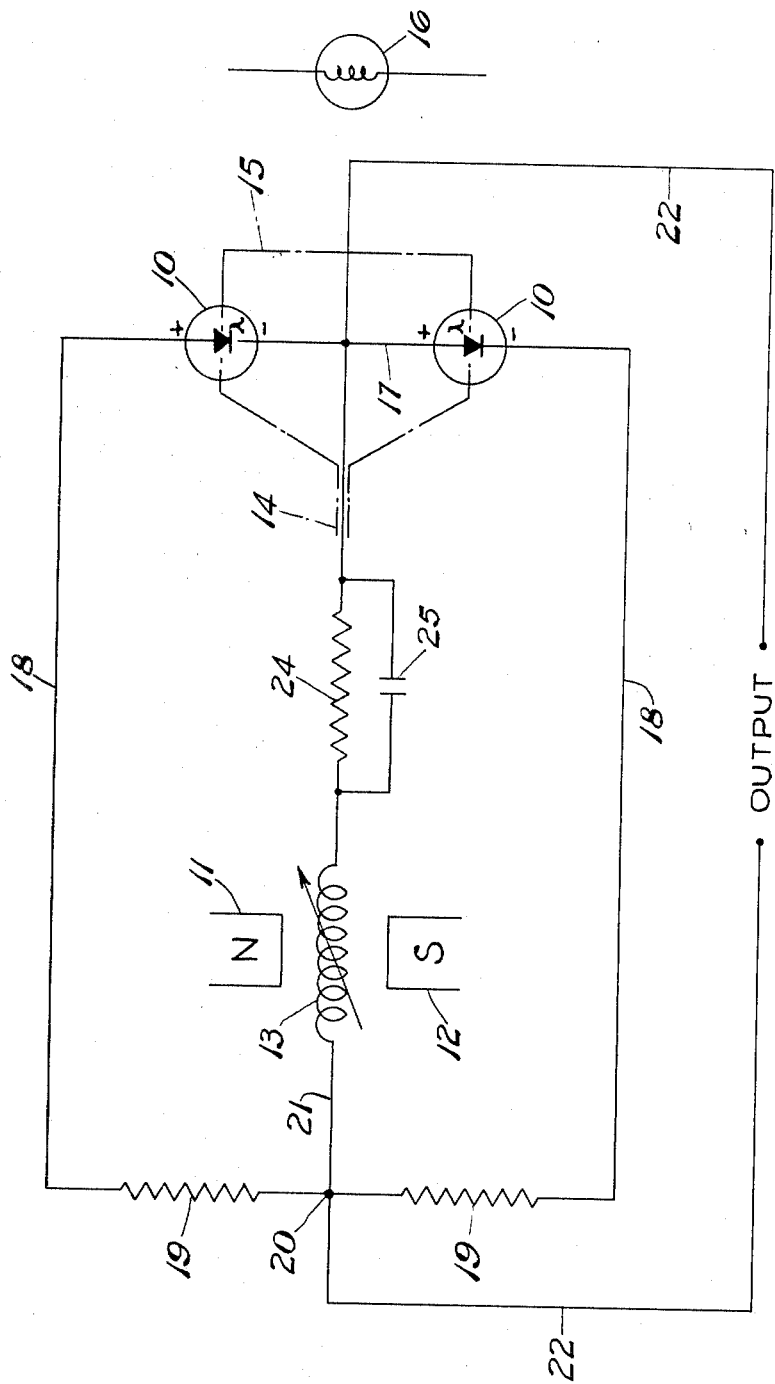

3,527,106
ACCELEROMETER
Walter J. Hirtreiter, 15 Ranch Trail,
Williamsville, N.Y. 14221
Continuation-in-part of application Ser. No. 213,308,
July 30, 1962. This application Dec. 29, 1966,
Ser. No. 605,903
Int. Cl. G01p *15/08*
U.S. Cl. 73—517                              1 Claim

ABSTRACT OF THE DISCLOSURE

An accelerometer wherein a mass which is normally in a medial position lies between a light source and a pair of balanced self-generating photocells so that movement of the mass in acceleration unbalances the distribution of light to the pair of photocells and thus creates an imbalance in their outputs. A combined readout and restoring means connects directly across the normally balanced output circuits so that the resistance of the readout and restoring means does not disturb the balance of the output circuit, the restoring means including magnetic means for restoring the mass to center position upon deflection thereof under acceleration forces.

---

This invention relates to accelerometers and particularly to an accelerometer wherein acceleration forces on a movable mass are detected by light sensitive electrical means.

This application is a continuation-in-part of my copending application, Ser. No. 213,308, filed July 30, 1962, now Pat. No. 3,295,378.

The accelerometer of the present invention is so arranged that conditions of imbalance of the sensitive mass caused by positive or negative acceleration forces produce electromotive balance-restoring forces proportionate to the displacement effects of acceleration on the sensitive mass. Thus the apparatus is effective throughout a relatively wide range of acceleration rates and forces although the actual displacement of the sensitive mass is minute throughout the range of the instrument due to the feedback effect of restoring forces generated by tendencies of the sensitive mass to move from a medial force-balanced position.

In the particular instance disclosed herein by way of example, the use of opposed photosensitive devices which are normally balanced by substantially equal illumination of both devices affords a very sensitive and effective accelerometer mass displacement indicator and corrective force generating system which requires a minimum of corrective adjustment and calibration. Due to the balancing effect of the two opposed photosensitive devices conditions which normally subject the same to variations in electrical performance are automatically neutralized or balanced out. Performance-modifying influences which would normally throw a single photo-sensitive signal out of adjustment or distort the same to give an inconstant response under constant acceleration conditions, such as temperature changes, are thus avoided to a substantial extent.

Again referring particularly to the accelerometer shown herein by way of example, the use of self-generating photoelectric cells of the transistor or semi-conductor type, such as silicon solar cells and silenium solar cells, inserted directly in the calibrating and balancing force generating circuitry eliminates the need for signal amplification, thus not only greatly simplifying the instrument but also eliminating numerous components needed for conventional amplification. Obviously such simplification and reduction in complexity elimniates many possible sources of trouble or inaccuracy. Even where amplification is desired and employed, the amplification may be effect so as not to affect the essentially symmetrically balanced arrangement of the photocells.

An important attribute of the accelerometer of the present invention is the fact that no electrical power supply is required, the output voltage being derived entirely from the current generated in the photovoltaic cells themselves, in response to the impingement of light thereon.

The instrument of the present invention may be employed as an inclinometer or precision level measuring device, in addition to its primary use as an accelerometer, the general interchangeability of devices of this character for these analogous uses being known in the accelerometer art.

While an exemplary embodiment of the principles of the present invention is illustrated in the drawing and described in the following specification, it is to be understood that such embodiment is for the purpose of setting forth the operating principles of the present invention and the scope of the invention is not limited to such exemplary embodiment or otherwise than as defined in the appended claims.

The single figure of the drawing is a wiring diagram of an accelerometer circuit arranged in accordance with one form of the present invention.

The physical structure of the accelerometer of the present invention may be substantially as disclosed in FIGS. 1 through 4 of my prior application, Ser. No. 213,308, of which the present application is a continuation-in-part, excepting as to the difference in configuration between the self-generating photo-electric cells of the present embodiment and the photo-conductive light sensitive cells 20 of the aforesaid parent application. In the present diagram the self-generating photo-electric cells designated 10 correspond to the aforesaid photo-cells 20 of my prior application.

In the aforesaid pending application a conventional zero-center meter is designated 16, such meter being a commercially available meter of the type known as a core type movement. A similar zero-center meter is employed in the accelerometer of the present application and the essential components thereof are shown schematically in the present drawing as comprising permanent magnet members designated 11 and 12, a force-balancing restoring electromagnetic winding 13, and a indicator hand or pointer 14. As in the embodiment of my prior application a plate member 15 fixed to an end of needle 14 serves as a light metering or light dividing plate and also has an inertia mass member which is subject to movements in the plane of the drawing and in a vertical direction, as viewed in the drawing.

It will be noted that the upper and lower edges of the plate 15, as viewed in the drawing, lie about diametrically across the two photo-cells 10 so that light from a source indicated schematically at 16 but actually lying perpendicularly centrally above plate member 15 as viewed in the drawing will cast equal quantities of light on each of the photo-cells 10 when plate member 15 is in its illustrated central position.

The positive terminal of one of the solar cells 10 is connected to the negative terminal of the other by a conductor 17. The opposite terminals of the solar cells 10 are connected to conductors 18 which contain identical resistances 19 and are joined as at 20 in the diagram.

A conductor 21 which contains the restoring winding 13 of the zero-center meter extends from the juncture 20 of conductors 18 to a midpoint of conductor 17 and output conductors 22 likewise extend from juncture 20 to the midpoint of conductor 17 so that the output conductors 22 are in parallel with conductor 21.

The conductor 21 which connects across the solar cell circuit as described above also includes a resistance 24 and a capacitance 25 connected thereabout. The resistance 24 normally many times greater than the resistance of winding 13 and is selected to determine the range of the instrument. The capacitance connection 25 about the resistance 24 is provided for stabilization.

The output conductors 22 may be connected with a galvanometer type of indicating instrument calibrated in any desired manner, or such output conductors may be connected to circuitry for effecting controls in response to changing conditions of acceleration or analogous conditions to which the apparatus of the present invention is arranged to respond.

When the plate member 15 moves upwardly as viewed in the diagram under acceleration or analogous forces, it lessens the light reaching the upper photo-cell 10 and increases the light which reaches the lower photo-cell 10. This increases the output of lower photo-cell 10 and reduces the output of upper photo-cell 10, causing current flow from right to left through conductor 21 with a potential equal to the difference between the output potentials of the two photo-cells.

A restoring winding 13 is so wound with respect to the north and south poles 11 and 12 of the permanent magnet portion of the meter that under the stated acceleration conditions winding 13 exerts a force on pointer 14 and plate 15 which opposes the displacing force of acceleration and this tends to urge the same downwardly as viewed in FIG. 5. In the case of acceleration in the opposite direction, or a negative acceleration, an opposite restoring force develops. At a given constant acceleration the mass will remain stabilized in a correspondingly displaced position with respect to the zero center position.

Thus, when the respective voltage outputs of the photocells are altered by deflection of the mass or seismic element 15 under the influence of acceleration, the resultant electrical energy is fed back to winding 13 which develops an electromagnetic force equal to and opposing the acceleration-induced force on the seismic element. This servo action results in a finite deflection of the mass or seismic element under which a force balance is caused to exist.

I claim:
1. In an accelerometer, a mass normally held in a medial position by magnetic force means and movable in opposite directions in response to positive and negative acceleration, a light source at one side of said mass in alignment therewith along a perpendicular to the direction of movement of said mass, a pair of self-generating silicon photo-voltaic cells located at the opposite side of said mass and spaced from each other at opposite sides of said perpendicular in the direction of movement of said mass, whereby said mass in its medial position divides light from said source equally between said photocells and upon movement under acceleration forces varies the ratio of light distribution as between said photocells, readout and restoring means comprising a zero center meter having magnetic means directly in circuit with said photocells and in balanced circuit relationship therewith for applying electromagnetic restoring forces to said mass upon deflection thereof from medial position under acceleration forces and for supplying a readout indication, a pair of conductors connecting said photocells to each other in a closed series, said restoring and readout means comprising a circuit connected across the midpoints of said conductors and including said magnetic means therein, and like fixed resistances in one of said conductors at opposite sides of its midpoint connection with said restoring circuit, the restoring force of said magnetic means being controlled as to direction and magnitude by the ratio of light distribution to said photocells.

References Cited

UNITED STATES PATENTS

| 2,096,902 | 10/1937 | Lamb | 250—210 XR |
| 2,995,935 | 8/1961 | Eyestone et al. | 73—517 |
| 3,091,972 | 6/1963 | Johnston | 73—517 |
| 3,142,990 | 8/1964 | Aske | 73—516 XR |
| 3,209,154 | 9/1965 | Maring | 250—212 XR |
| 3,295,378 | 1/1967 | Hirtreiter | 73—517 |

JAMES J. GILL, Primary Examiner